US009768855B2

United States Patent
Lange (10) Patent No.: US 9,768,855 B2
(45) Date of Patent: Sep. 19, 2017

(54) MULTI-STAGE ISOLATION SUB-SYSTEM FOR A REMOTE ANTENNA UNIT

(71) Applicant: CommScope Technologies LLC, Hickory, NC (US)

(72) Inventor: Keld Knut Lange, Oetisheim (DE)

(73) Assignee: CommScope Technologies LLC, Hickory, NC (US)

(*) Notice: Subject to any disclaimer, the term of this patent is extended or adjusted under 35 U.S.C. 154(b) by 0 days.

(21) Appl. No.: 15/114,624

(22) PCT Filed: Jan. 21, 2015

(86) PCT No.: PCT/US2015/012236
§ 371 (c)(1),
(2) Date: Jul. 27, 2016

(87) PCT Pub. No.: WO2015/112592
PCT Pub. Date: Jul. 30, 2015

(65) Prior Publication Data
US 2016/0352411 A1    Dec. 1, 2016

Related U.S. Application Data

(60) Provisional application No. 61/931,936, filed on Jan. 27, 2014.

(51) Int. Cl.
*H04B 7/155* (2006.01)
*H04L 25/03* (2006.01)
*H04W 88/08* (2009.01)

(52) U.S. Cl.
CPC ... *H04B 7/15585* (2013.01); *H04L 25/03082* (2013.01); *H04W 88/085* (2013.01); *H04L 2025/03496* (2013.01)

(58) Field of Classification Search
CPC .................. H04B 7/15585; H04W 88/085
See application file for complete search history.

(56) References Cited

U.S. PATENT DOCUMENTS 5,691,978 A    11/1997   Kenworthy
7,239,217 B2    7/2007   Satoh et al.
(Continued)

OTHER PUBLICATIONS

International Search Authority, "International Search Report and Written Opinion for PCT Application No. PCT/US2015/012236", "PCT Filing Claiming Priority to U.S. Appl. No. 61/931,936", Apr. 22, 2015, pp. 1-12, Published in: WO.

(Continued)

*Primary Examiner* — Tuan H Nguyen
(74) *Attorney, Agent, or Firm* — Fogg & Powers LLC (57) ABSTRACT

Certain features relate to a remote antenna unit having a multi-stage isolation sub-system for isolating uplink and downlink signal paths. A multi-stage isolation sub-system in the remote antenna unit can include a first stage device that is configured to generate a cancellation signal for canceling unwanted downlink signals received at the uplink antenna. The isolation sub-system can also include a second stage device configured to generate a cancellation signal that attenuates residual noise and intermodulation products generated in the downlink path and received in the uplink path. The multi-stage isolation sub-system can combine the cancellation signals with signals received on the uplink path in order to cancel or attenuate downlink leakage signals and residual noise present on the uplink path.

20 Claims, 5 Drawing Sheets

(56) References Cited

U.S. PATENT DOCUMENTS

| | | | |
|---|---|---|---|
| 7,809,047 | B2 | 10/2010 | Kummetz |
| 8,509,125 | B1 | 8/2013 | Venkataraman |
| 2009/0207896 | A1 | 8/2009 | Behzad |
| 2009/0232510 | A1 | 9/2009 | Gupta et al. |
| 2009/0238573 | A1 | 9/2009 | Bauman |
| 2010/0166109 | A1 | 7/2010 | Neumann et al. |
| 2010/0197231 | A1 | 8/2010 | Kenington |
| 2011/0149714 | A1 | 6/2011 | Rimini et al. |
| 2011/0158081 | A1 | 6/2011 | Wang et al. |
| 2011/0228828 | A1 | 9/2011 | Wang et al. |
| 2012/0140860 | A1 | 6/2012 | Rimini et al. |
| 2012/0309328 | A1 | 12/2012 | Morrison et al. |
| 2012/0329523 | A1 | 12/2012 | Stewart et al. |
| 2013/0077556 | A1* | 3/2013 | Gore .................. H04B 7/15578 370/315 |
| 2013/0077720 | A1 | 3/2013 | Wang et al. |
| 2013/0155913 | A1 | 6/2013 | Sarca |
| 2013/0310090 | A1* | 11/2013 | Bevan .................. H04B 1/1027 455/501 |
| 2014/0119411 | A1 | 5/2014 | Kummetz |

OTHER PUBLICATIONS

China State Intellectual Property Office, "Second Office Action—Application No. 201280039576.8", "from U.S. Appl. No. 13/495,220", Nov. 3, 2016, pp. 1-22, Published in: CN.

China Patent Office, "First Office Action for CN Application No. 201280039576.8", "from Foreign Counterpart to U.S. Appl. No. 13/495,220", Mar. 4, 2016, pp. 1-24, Published in: CN.

European Patent Office, "Extended European Search Report for Application Serial No. 12800117.9", "from Foreign Counterpart to U.S. Appl. No. 13/495,220", Feb. 27, 2015, pp. 1-6, Published in: EP.

United States Patent and Trademark Office, "Advisory Action", "from U.S. Appl. No. 13/495,220", Dec. 21, 2015, pp. 1-12, Published in: US.

United States Patent and Trademark Office, "Final Office Action", "from U.S. Appl. No. 13/495,220", Oct. 5, 2015, pp. 1-16, Published in: US.

United States Patent and Trademark Office, "Office Action", "from U.S. Appl. No. 13/495,220", May 7, 2015, pp. 1-25, Published in: US.

United States Patent and Trademark Office, "Office Action", "from U.S. Appl. No. 13/495,220", Sep. 8, 2016, pp. 1-20, Published in: US.

The International Bureau of WIPO, "International Preliminary Report on Patentability from PCT Application No. PCT/US2012/042148 mailed Jan. 3, 2014", "from PCT Counterpart of U.S. Appl. No. 13/495,220", Jan. 3, 2014, pp. 1-9, Published in: CH.

International Searching Authority, "International Search Report", "from Foreign Counterpart of U.S. Appl. No. 13/495,220", Jan. 31, 2013, pp. 1-12, Published in: WO.

European Patent Office, "Extended European Search Report for EP Application No. 15740351.0", "Foreign Counterpart to U.S. Appl. No. 15/114,624", dated Jun. 16, 2017, pp. 1-11, Published in: EP.

\* cited by examiner

MULTI-STAGE ISOLATION SUB-SYSTEM FOR A REMOTE ANTENNA UNIT

CROSS-REFERENCE TO RELATED APPLICATIONS

This application claims priority to PCT Application Ser. No. PCT/US2015/012236, filed Jan. 21, 2015 and titled "MULTI-STAGE ISOLATION SUB-SYSTEM FOR A REMOTE ANTENNA UNIT," which claims the benefit of U.S. Provisional Application Ser. No. 61/931,936, filed Jan. 27, 2014 and titled "A Multi-Stage Isolation Sub-System for Remote Antenna Unit," the contents of all of which are hereby incorporated by reference.

TECHNICAL FIELD

The present disclosure relates generally to telecommunications systems and more particularly (although not necessarily exclusively) to remote antenna units in distributed antenna systems that can be configured to provide enhanced signal isolation.

BACKGROUND

A distributed antenna system ("DAS") can include one or more head-end units and multiple remote antenna units coupled to each head-end unit. A DAS can be used to extend wireless coverage in an area. Head-end units can be connected to base stations. A head-end unit can receive downlink signals from the base station and distribute downlink signals in analog or digital format to a radio frequency distribution system, which can include one or more remote antenna units. The remote antenna units can transmit the downlink signals to user equipment devices within coverage areas serviced by the remote antenna units. In the uplink direction, signals from user equipment devices may be received by the remote antenna units. The remote antenna units can transmit the uplink signals received from user equipment devices to the head-end unit. The head-end unit can transmit uplink signals to the serving base stations.

Often, remote antenna units in a DAS can transmit and receive radio signals simultaneously in multiple frequency bands. Simultaneously transmitting and receiving signals, however, can cause signal distortion in the uplink paths of the remote antenna units. For example, downlink signals transmitted by a remote antenna unit or intermodulation products of downlink signals may leak into an uplink signal path of the remote antenna unit.

Remote antenna units can use a cavity filter for providing signal isolation between the transmit path and the receive path. Cavity filters, however, can be large and expensive, and can therefore be undesirable in remote antenna units. Other options that may allow a remote antenna unit to avoid using a cavity filter include reducing the uplink or downlink power. Reducing the uplink or downlink power, however, undesirably limits the upper power of the telecommunication system.

It is desirable to provide improved isolation between uplink and downlink path in a remote antenna unit.

SUMMARY

According to one aspect, a multi-stage isolation sub-system is provided. The multi-stage isolation sub-system can include a first stage device and a second stage device that is communicatively coupled to the first stage device. The first stage device can include an air interface modeling module and is configured to generate a first cancellation signal for attenuating a downlink leakage signal received on an uplink channel. The first cancellation signal can have an inverse phase as compared to the downlink leakage signal. The second stage device can include a non-linearity modeling module and is configured to generate a second cancellation signal for attenuating residual downlink noise and downlink intermodulation products in a receiving frequency band.

According to another aspect, a method is provided. The method can include generating a first cancellation signal comprising an inverse phase of a downlink leakage signal received on an uplink channel based on an air interface model. The method can also include generating a second cancellation signal for attenuating residual downlink noise and downlink intermodulation products received on the uplink channel based on a non-linearity model. The method can further include attenuating the downlink leakage signal by combining the first cancellation signal with signals received on the uplink channel and attenuating the residual downlink noise and downlink intermodulation products by combining the second cancellation signal with the signals received on the uplink channel.

According to another aspect, a remote antenna unit is provided. The remote antenna unit can include a multi-stage isolation sub-system communicatively coupled to an uplink antenna and a downlink antenna. The multi-stage isolation sub-system can include a first stage device configured to generate a first cancellation signal. The first cancellation signal can have an inverse phase as compared to a downlink leakage signal received at the uplink antenna. The multi-stage isolation sub-system can also include a second stage device communicatively coupled to the first stage device. The second stage device can include a non-linearity modeling module and can be configured to generate a second cancellation signal to attenuate residual downlink noise and downlink intermodulation products received at the uplink antenna.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Certain aspects and features relate to a multi-stage isolation sub-system for a remote antenna unit in a telecommunication system. The multi-stage isolation sub-system can provide signal isolation between uplink and downlink signal paths in the remote antenna unit by modeling the air interface between the uplink and downlink paths and using the air interface model to generate cancellation signals. In some aspects, a cancellation signal can be a signal having an inverse phase in comparison to another signal. The cancellation signals can reduce or eliminate different types of distortions received in the uplink path of a remote antenna unit. The cancellation signal can be generated by inverting one or more signal components of a signal, including (but not limited to) the phase of the signal. For example, the cancellation signal can include both phase and frequency components that are inverse of the phase and frequency of unwanted signal components.

According to certain aspects, a first stage device in a multi-stage isolation sub-system can generate a cancellation signal that can be used for cancelling or attenuating downlink leakage signals that can be received by the uplink antenna of the remote antenna unit. The downlink leakage can depend on various environmental factors (e.g., the room dimensions, whether people are moving nearby, whether doors are moving or not). As a result, the leakage channel between the downlink and uplink can slowly change over time. The multi-stage isolation sub-system can model this time-varying channel using a reference signal for the downlink signals that are received at the uplink antenna ports. As used herein, a "reference signal" may refer to the signal used to generate the cancellation signal that can attenuate the downlink leakage on the uplink path. The reference signal can be obtained by filtering the uplink signal with a filter having a passband at the downlink frequency band. The phase of the cancellation signal can be inverse (i.e., opposite) to the phase of the reference signal. For example, if the phase difference between the cancellation signal and the reference signal is 180 degrees, then the phase of the cancellation signal is inverse to the phase of the reference signal. By combining the signals received on the uplink transmission path with the generated cancellation signal, the leaked downlink components on the uplink path can be canceled or attenuated.

A second stage device in the multi-stage isolation sub-system can generate a cancellation signal that can be used for attenuating additional residual noise or intermodulation products generated in the downlink path and received in the uplink path. The residual noise or intermodulation products can thereby be removed from uplink signals traversing the uplink path of the remote antenna unit. The reference signal used to generate a cancellation signal for attenuating additional residual noise can be obtained by filtering the uplink signal with a filter having a passband at the uplink frequency band.

It is appreciated that perfect cancellation of the downlink leakage signal and residual noise and intermodulation products may not be required. For example, additional isolation between the uplink and downlink paths can be achieved by reducing the downlink signal power by 20-30 dB.

The multi-stage isolation sub-system described herein can increase the isolation between the uplink and downlink signals such that the downlink output power can be increased while minimizing interference at the input to a low-noise amplifier following the uplink antenna. Further, a multi-stage isolation sub-system can provide a more flexible solution than remote antenna units that uses cavity filters to provide antenna isolation. For example, the remote antenna unit described herein can be configured to transmit using a greater variety of power levels or utilize smaller antennas with less isolation. A multi-stage isolation sub-system can also provide a solution in which no cavity filtering is required to provide antenna isolation.

In some aspects, the remote antenna unit can be configured for frequency division duplexing ("FDD") operation. In other aspects, the remote antenna unit can be configured for time division duplexing ("TDD") operation. In additional or alternative aspects, the remote antenna unit can be configured for both FDD and TDD operation. Simultaneous support for multiple unsynchronized TDD systems (e.g., Wi-Fi) or joint operation of TDD and FDD may be beneficial (e.g., LTE-FDD/TD-LTE operation in band 7/band 38).

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
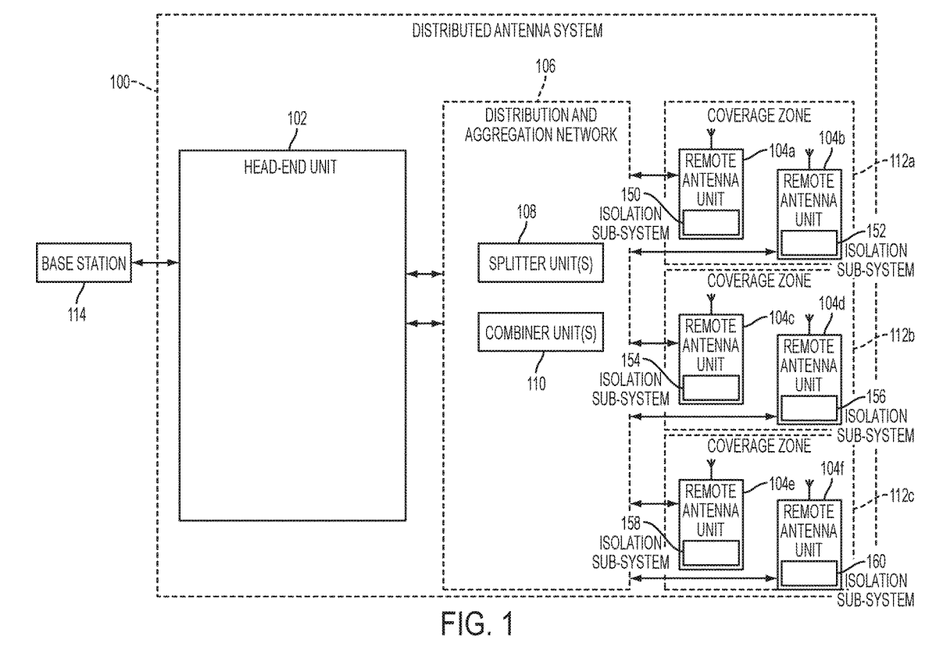
FIG. 1 depicts an example of a base station and a distributed antenna system comprising remote antenna units that can be configured for enhanced signal isolation according to one aspect of the present disclosure.

FIG. 1 depicts an example of a distributed antenna system ("DAS") 100 that includes a network of spatially separated remote antenna units 104a-f coupled to a head-end unit 102. The remote antenna units 104a-f can be communicatively coupled to a common signal source, such as the head-end unit 102, for communicating with a base station 114. In one aspect the remote antenna units 104a-f can be coupled directly to the head-end unit 102. In other aspects, the remote antenna units 104a-f can be coupled to the head-end unit 102 via a distribution and aggregation network 106 comprising one or more splitter units 108, combiner units 110, and a transport network including transportation media for communicatively coupling components of the distribution and aggregation network 106 that are distributed over a building or other area serviced by the DAS 100.

The head-end unit 102 can receive downlink signals from one or more base stations 114 and transmit uplink signals to the base station 114. Any suitable communication link can be used for communication between the base station 114 and the head-end unit 102, such as (but not limited to) a direct connection or a wireless connection. A direct connection can include, for example, a connection via a copper, optical fiber, or other suitable communication medium. The head-end unit 102 can transmit downlink signals to the remote antenna units 104a-f and receive uplink signals from the remote antenna units 104a-f. Any suitable communication link can be used for communication between the head-end unit 102 and remote antenna units 104a-f, such as (but not limited to) a direct connection or a wireless connection.

The distribution and aggregation network 106 can be a passive radio distribution network for splitting and combining signals between the head-end unit 102 and the remote antenna units 102a-f. For example, the splitter units 108 may split downlink signals received from a base station 114 for transmission to multiple remote antenna units and the combiner units 110 may combine uplink signals received from the remote antenna units 104a-f for transmission to the head-end unit 102.

The remote antenna units 104a-f can provide signal coverage in coverage zones 112a-c by transmitting downlink signals to mobile communication devices or other user equipment in the coverage zones 112a-c and receiving uplink signals from the mobile communication devices or other user equipment in the coverage zones 112a-c. The remote antenna units 104a-f can transmit uplink signals to the head-end unit 102 or other unit. The head-end unit 102 or other unit can combine uplink signals received from remote antenna units 104*a-f* for transmission to the base station 114.

Figure 2:
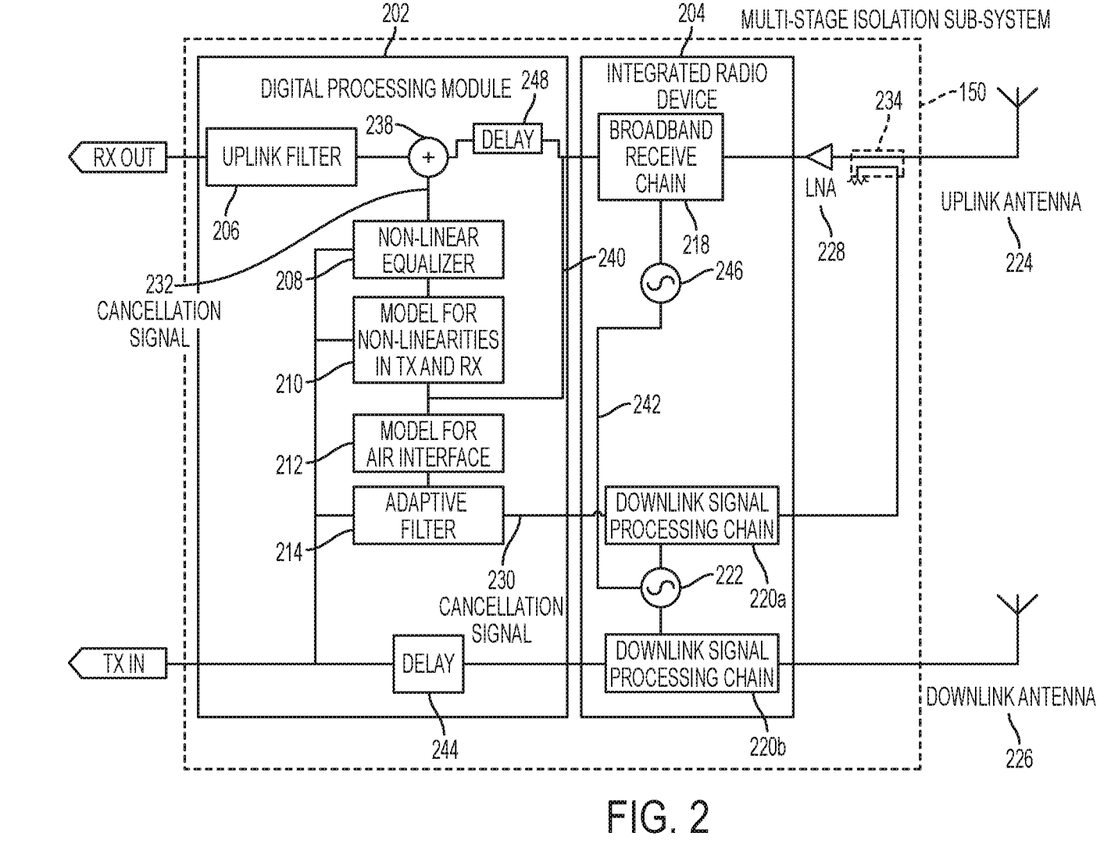
FIG. 2 is a block diagram depicting an example of a multi-stage isolation sub-system in a remote antenna unit according to one aspect of the present disclosure.
Figure 3:
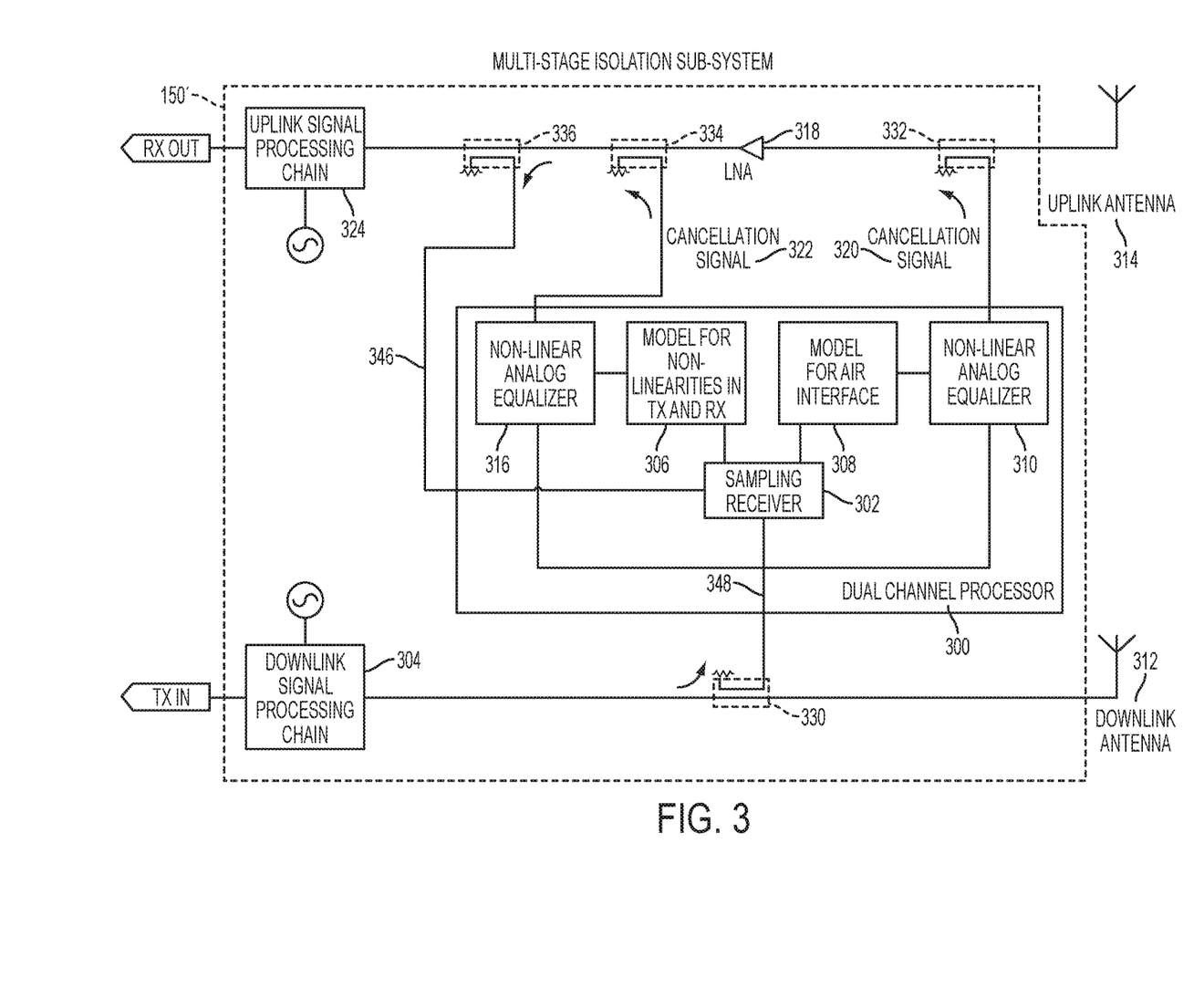
FIG. 3 is a block diagram depicting an alternative example of a multi-stage isolation sub-system in a remote antenna unit according to one aspect of the present disclosure.
Figure 4:
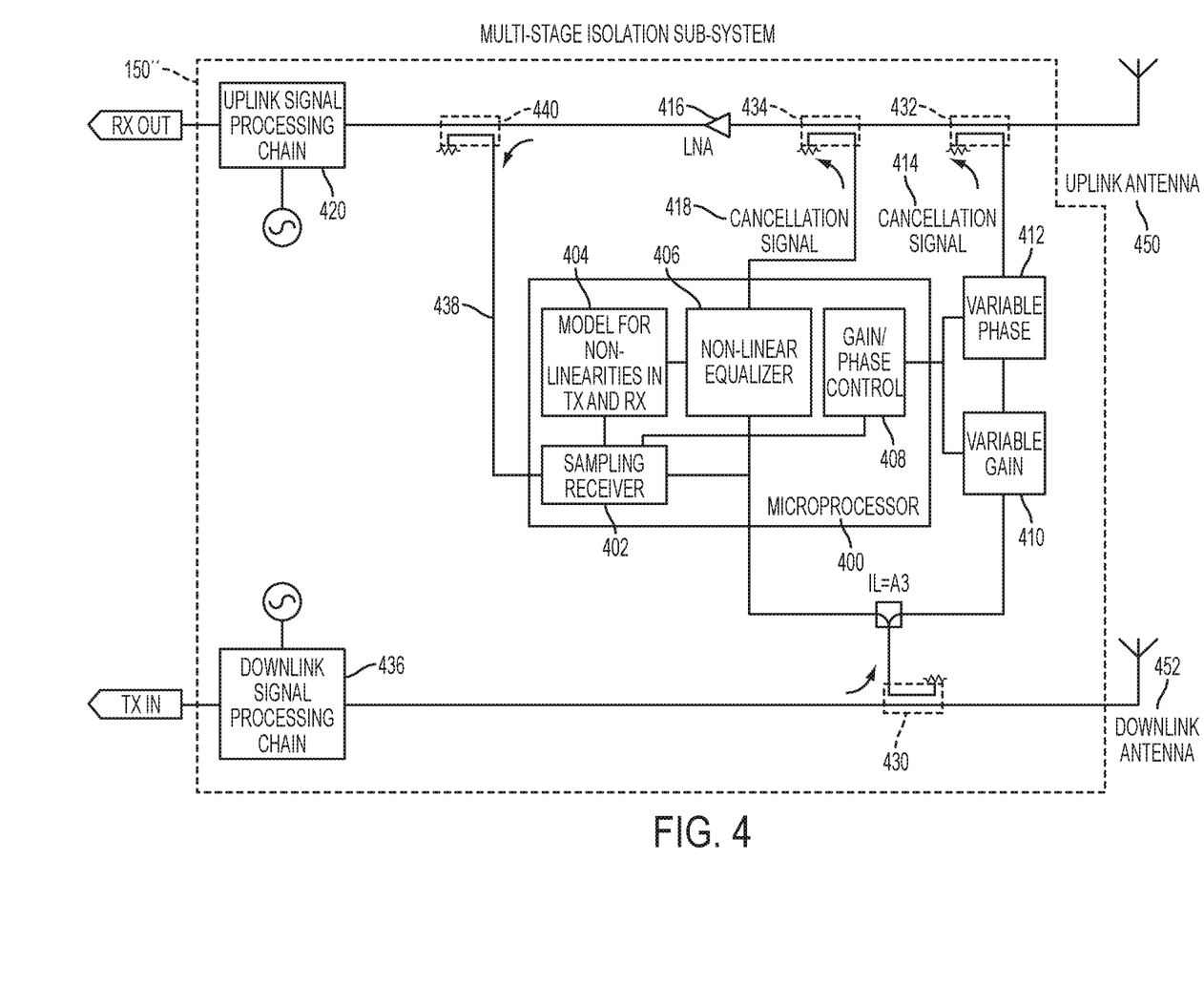
FIG. 4 is a block diagram depicting another example of a multi-stage isolation sub-system in a remote antenna unit according to one aspect of the present disclosure.

The remote antenna units 104*a-f* can include multi-stage isolation sub-systems 150, 152, 154, 156, 158, and 160, respectively, for attenuating downlink leakage signals and residual noise received on the uplink antennas of the remote antenna units 104*a-f*. In some aspects, remote antenna units 104*a-f* may support multi-band operation and include multiple sets of transmit and receive antennas, each set of transmit and receive antennas supporting different frequency bands. Remote antenna units 104*a-f* with multiple sets of transmit and receive antennas can include multiple multi-stage isolation sub-systems. FIGS. 2-4 depict examples of certain configurations of a multi-stage isolation sub-system.

FIG. 2 depicts an example of a multi-stage isolation sub-system 150 of a remote antenna unit 104*a*. The remote antenna unit 104*a* transmits downlink signals on a downlink antenna 226 and receives uplink signals on an uplink antenna 224. Downlink signals transmitted by the downlink antenna 226 can leak into the uplink antenna 224. The multi-stage isolation sub-system 150 can reduce this unwanted leakage via a digital processing module 202 communicatively coupled to an integrated radio device 204. Although the term "integrated radio device" is used and depicted in FIG. 2, other implementations are possible. For example, in some aspects, the integrated radio device 204 can be replaced with or supplemented by any discrete device or multiple discrete devices that perform the functionality of the integrated radio device 204 as described herein.

The integrated radio device 204 can operate as the interface between the uplink antenna 224 and the downlink antenna 226 (which respectively receive and transmit analog RF waveforms) and the digital processing module 202 (which can process binary information formatted in digital sequences of 1s and 0s). The integrated radio device 204 may include an broadband receive chain 218 and two downlink signal processing chains 220*a-b*. The term "broadband" can refer to the capability to transmit and receive multiple frequency bands. The broadband receive chain 218 can be positioned in an uplink path and can include down-conversion circuitry. Each of the downlink signal processing chains 220*a-b* can include up-conversion circuitry. Each of the broadband receive chain 218 and the downlink signal processing chains 220*a-b* can be communicatively coupled to local oscillators 222, 246. The local oscillators 222, 246 can generate a signal that is used for up-conversion of downlink signals and down-conversion of uplink signals. In some aspects, the local oscillators 222, 246 can be shared between the broadband receive chain 218 and the downlink signal processing chains 220*a-b*. Further, while two local oscillators 222, 246 are shown for illustrative purposes, it is understood that in other aspects, each processing chain may be associated with an individual local oscillator. In other aspects, the integrated radio device 204 may not include the downlink signal processing chain 220*a*.

The broadband receive chain 218 can be included in or communicatively coupled to the uplink path. The broadband receive chain 218 can be communicatively coupled to the uplink antenna 224 and a low-noise amplifier 228. The low-noise amplifier 228 can amplify signals received via the uplink antenna 224. The broadband receive chain 218 can convert the uplink analog RF waveform to a digital signal for input to the digital processing module 202. The uplink antenna 224 may also be communicatively coupled to the downlink signal processing chain 220*a* via a reference path 242 between the uplink and downlink paths. The downlink signal processing chain 220*b* can be communicatively coupled to the downlink antenna 226. The downlink signal processing chain 220*b* can convert downlink digital signals received from the digital processing module 202 to downlink analog RF waveforms for transmission.

The digital processing module 202 can model an air interface channel that exists between the uplink antenna 224 and the downlink antenna 226. The digital processing module 202 can use the air interface model to generate a first cancellation signal 230 that can cancel or otherwise attenuate leaked downlink signals traversing the uplink path. The digital processing module 202 can also generate a second cancellation signal 232 that can be used for cancelling signal components resulting from non-linearities in the uplink and downlink path (e.g., intermodulation products), downlink interference resulting from noise generated by components in the downlink path, and downlink interference generated by variations in the air interface between the downlink antenna 226 and the uplink antenna 224.

The digital processing module 202 can be implemented using any suitable processing device that can process digital signals (i.e., signals carrying information formatted as binary sequences of 1s and 0s). Non-limiting examples of suitable processing devices include a field-programmable gate array ("FPGA"), a microprocessor, a peripheral interface controller ("PIC"), an application-specific integrated circuit ("ASIC"), or other suitable processor. The particular hardware used to implement the subject matter described herein may depend on the desired adaptation speed. For example, the adaptation algorithm may be implemented using a microprocessor (very slow), a digital signal processor (DSP) (slow) or FPGA/vector processor (fast).

The first cancellation signal 230 can be generated in the digital processing module 202 using an adaptive filter 214 communicatively coupled to an air interface modeling module 212. Downlink signals that leak into the uplink signal path can be sampled from the uplink path. The sampled signal can be provided to the air interface modeling module 212 as a reference signal 240. Using the reference signal 240, the air interface modeling module 212 can model the air interface that exists between the downlink antenna 226 and the uplink antenna 224 and generate parameters to control the adaptive filter 214. The air interface modeling module 212 can generate parameters of the air interface using, for example, a least means square ("LMS") filter approach, Wiener filter, zero forcing equalizer, or kernel filters. For example, an LMS algorithm including the formula $e(n)=(y(n)+v(n))-\hat{y}(n)$ can be used to model the air interface. The air interface can correspond to the unknown system $y(n)$ in the LMS algorithm. The uplink signal can be filtered using a filter having a passband at the downlink frequency band. The filtered uplink signal can correspond to the $\hat{y}(n)$ term in the LMS algorithm. Non-linearities in the downlink signal processing chain and the LNA can correspond to interference $v(n)$ in the LMS algorithm. The reference signal can correspond to an error signal $e(n)$ in the LMS algorithm. Based on the LMS algorithm, the air interface $y(n)$ can be determined from the interference $v(n)$ (i.e., the non-linearities in the downlink signal processing chain and the LNA), the error signal $e(n)$ (i.e., the reference signal), and the filtered input signal $\hat{y}(n)$ (i.e. the filtered uplink signal). The parameters generated by the air interface modeling module 212 can include information indicating the amount of amplitude adjustment required to match the leakage downlink signal received at the uplink signal. The parameters can also include information indicating the amount of phase shift to apply in order to generate a signal with an opposite phase to the downlink leakage signal. In other aspects, more complex air interfaces can be modeled. For example, the air interface modeling module 212 can generate parameters that take into account several signal reflection paths.

The parameters generated by the air interface modeling module 212 can be provided to the adaptive filter 214. The adaptive filter 214 can use the received parameters to process the amplitude and phase of the downlink signal to generate the first cancellation signal 230. The first cancellation signal 230 can be provided from the adaptive filter 214 to the downlink signal processing chain 220a in the integrated radio device 204 for up-conversion to an RF frequency and digital-to-analog conversion. After processing in the integrated radio device 204, the first cancellation signal 230 can be coupled to the uplink path via a coupler 234 at a point before the low-noise amplifier 228. As used herein, a coupler can include a standard power combiner or other device that can combine two radio frequency signals. In aspects where the downlink signal processing chain 220a is not included in the integrated radio device 204, multi-stage isolation sub-system may not include the coupler 234.

To generate the second cancellation signal 232, the reference signal 240 can be sampled from the downlink leakage signal on the uplink path and provided to a non-linearity modeling module 210. The non-linearity modeling module 210 can process the reference signal 240 to model the effects of non-linearities in the downlink and uplink paths. Effects of non-linearities in the downlink and uplink paths can include distortions caused by the downlink signal in the uplink frequency band. Models of the effects of non-linearities in the downlink and uplink paths can be used to generate the second cancellation signal 232 to compensate for the non-linearities. Non-linearities in the downlink and uplink paths can be modeled using similar techniques to that of digital pre-distortion of amplifiers. The non-linearities model can be used to compensate for non-linearities in the downlink signal processing chain, the LNA and the uplink signal processing chain. Using the non-linearities model can minimize the distortions caused by the downlink signal in the uplink frequency band. A mathematical model corresponding to distortion caused by non-linearities can be determined based on hardware characteristics of the devices in the downlink signal processing chain and/or interconnections between devices in the chain, the LNA, and the devices in the uplink signal processing chain and/or interconnections between devices in the chain. The mathematical model can also correspond to distortion caused by non-linearities in the air interface. In additional or alternative aspects, one or more signal paths can be modeled as one or more Volterra filter stages to obtain a non-linearities model.

Based on the non-linearity model, the non-linearity modeling module 210 can generate parameters to control a non-linear equalizer 208 that is communicatively coupled to the non-linearity modeling module 210 and the downlink path. The parameters from the non-linearity modeling module 210 can indicate the amount of phase shift to apply to the downlink signal in order to generate a signal with an inverse phase with any residual noise and intermodulation byproducts. The non-linear equalizer 208 (which can be implemented as a higher order equalizer) can modify the downlink signal to create the second cancellation signal 232 to cancel residual intermodulation products in the uplink path. The second cancellation signal 232 can be combined with digital signals on the uplink path at a point before the uplink filter 206 using a summation device 238. Delay units 244, 248 can be used to compensate for the processing delay caused by the adaptive filter 214 and the non-linear equalizer 208.

In some aspects, one or more of the uplink filter 206, the non-linear equalizer 208, the non-linearity modeling module 210, the air interface modeling module 212, and an adaptive filter 214 can be implemented as software modules executed by a processing device. In additional or alternative aspects, one or more of the uplink filter 206, the non-linear equalizer 208, the non-linearity modeling module 210, the air interface modeling module 212, and the adaptive filter 214 can be implemented using suitable hardware devices such as an FPGA or a vector processor.

In other aspects, the non-linear equalizer 208 can be implemented as a higher order equalizer including a finite impulse response ("FIR") filter. The air interface modeling module 212 can model air interface parameters as FIR coefficients that are calculated using a microprocessor or other suitable processing device. The parameters of the air interface model can be fed into an adaptive filter implemented as a FIR filter on an FPGA processor or other suitable processing device. The FIR filter can correspond to an air interface radio channel. The non-linearity modeling module 210 can model parameters as FIR coefficients for Volterra stages. The FIR coefficients can be calculated on a microprocessor or other suitable processing device. The parameters can be fed into a Volterra model on the a microprocessor or other suitable processing device.

FIG. 3 depicts an alternative example of a multi-stage isolation sub-system 150' of remote antenna unit 104a'. Similar to the system depicted in FIG. 2, the multi-stage isolation sub-system 150' depicted in FIG. 3 can model the air interface channel between the uplink and downlink path and also model non-linearities that may exist in the air interface or the LNA 318. The air interface model can be used to generate a first cancellation signal 320 to cancel or attenuate downlink leakage signals received by the uplink antenna 314. The model for non-linearities can be used to generate a second cancellation signal 322 that can cancel or attenuate the additional non-linearities by the LNA 318. The second cancellation signal 322 can also attenuate non-linear components of a downlink signal processing chain 304 by minimizing the power in the receive band. A noise contribution from the transmitter chain in the receive band may be uncorrelated with a desired signal that has been received.

The multi-stage isolation sub-system 150' includes a dual channel processor 300. A non-limiting example of a dual channel processer is a Scintera SC2200. The dual channel processor 300 is communicatively coupled to the downlink path via a coupler 330 and is communicatively coupled to multiple points in the uplink path via couplers 332, 334, 336. A downlink signal, after being processed in the downlink signal processing chain 304, is provided to a sampling receiver 302 and non-linear equalizers 310, 316. The downlink signal provided from coupler 330 can be used as a reference signal 348 for the downlink path. The sampling receiver 302 also receives a second reference signal 346 for the downlink leakage signal received at the uplink channel. The coupler 336 can communicatively couple the sampling receiver 302 to the uplink path. The coupler 336 can capture both the uplink and downlink frequency bands. The sampling receiver 302 can include any suitable broadband receiver with a capture unit. The sampling receiver 302 is communicatively coupled to a non-linearity modeling module 306 and air interface modeling module 308. The reference signal 348 received via the coupler 330 can be used to adapt the first stage of the multi-stage isolation subsystem 150', and the second reference signal 346 can be used to adapt the second stage of the multi-stage isolation sub-system 150'.

Using the reference signal 346, the air interface modeling module 308 models the air interface between the uplink channel and the downlink channel. The air interface modeling module 308 uses the air interface model to calculate an amount of phase shift to apply to the direct path of the received uplink signals to attenuate downlink leakage signals. In other aspects, the air interface modeling module 308 can use the air interface model to calculate parameters for a higher order filter in order to attenuate downlink leakage signals from reflected RF paths. The air interface modeling module 308 provides parameters for controlling the non-linear equalizer 310. For example, the air interface modeling module 308 can provide parameters that can include the amount of phase shift and the amount of amplitude shift per direct or reflected radio path to apply in order to match the inverse phase of the downlink leakage signal. The non-linear equalizer 310 uses the parameters from the air interface modeling module 308 to generate the first cancellation signal 320. The first cancellation signal 320 can be combined with signals on the uplink path at a point before a low-noise amplifier 318 using the coupler 332, thereby canceling or attenuating the downlink leakage signals traversing the uplink path.

Using the reference signal 346, the non-linearity modeling module 306 models the residual noise and non-linearities of the LNA 318 between the uplink path and the downlink path. The non-linearity modeling module 306 provides parameters identifying the amount of phase shift to apply to the uplink signal to attenuate the residual noise and intermodulation products to the non-linear equalizer 316. The non-linear analog equalizer 316 uses the parameters received from the non-linearity modeling module 306 to provide the second cancellation signal 322. The second cancellation signal 322 may be outputted by the non-linear analog equalizer 316 and coupled to the uplink path after the low-noise amplifier 318. The uplink path signal, after being processed by the first cancellation signal 320 and the second cancellation signal 322, may be provided back into the sampling receiver 302 or provided to an uplink signal processing chain 324 for uplink signal processing.

FIG. 4 depicts another example of a block diagram for a multi-stage isolation sub-system 150" of remote antenna unit 104(a)". Similar to the systems depicted in FIGS. 2 and 3, the multi-stage isolation sub-system 150" can model the air interface channel between the uplink and downlink path as well as the non-linearities that may exist in the LNA 416 and the air interface. The air interface model can be used to generate a first cancellation signal 414 to cancel or attenuate downlink leakage signals received on the uplink path. In some aspects, the air interface model can focus on the direct RF path between the uplink antenna 450 and the downlink antenna 452. The model for non-linearities can be used to generate a second cancellation signal 418 that can cancel or attenuate the additional non-linearities in the downlink path and the uplink path.

The isolation sub-system 150" can include a single channel microprocessor 400. A non-limiting example of a single channel microprocessor 400 is a Scintera SC1894. The single channel microprocessor 400 is communicatively coupled to the downlink path via a coupler 430 and communicatively coupled to multiple points in the uplink path via couplers 432, 434, 440. A downlink signal, after being processed by a downlink signal processing chain 436, can be sampled from the downlink path via the coupler 430. The sampled signal can be provided to the single channel microprocessor 400 and a variable gain module 410. The sampled signal can be provided to a sampling receiver 402 and a non-linear equalizer 406 of the single channel microprocessor 400. Downlink signals that leak into the uplink path can be sampled via the coupler 440. The sampled downlink leakage signal can be provided to the sampling receiver 402 as a reference signal 438.

The sampling receiver 402 in the single channel microprocessor 400 can be communicatively coupled to a non-linearity modeling module 404 and a gain/phase control module 408. Parameters generated by the non-linear equalizer 406 can be provided to the gain/phase control module 408. The gain/phase control module 408 can drive the variable phase unit 412 and the variable gain unit 410 to adjust the phase and amplitude of the received signal and thus attenuate the downlink leakage signal received at the uplink antenna 450. Adjusting the phase of the incoming signal can also accommodate for any delay and signal loss due to antenna coupling.

The sampling receiver 402 is also communicatively coupled to a non-linearity modeling module 404. The non-linearity modeling module 404 can generate parameters for controlling the non-linear equalizer 406. Similar to FIGS. 2-3, the parameters generated by the non-linearity modeling module 404 can include an amplitude adjustment and amount of phase shift to apply in order to attenuate downlink noise and intermodulation products. Based on the parameters from the non-linearity modeling module 404, the non-linear equalizer 406 can generate the second cancellation signal 418. The second cancellation signal 418 can be coupled to the uplink path at a point before a low-noise amplifier 416. The attenuated signal can be further processed by an uplink signal processing chain 420 for uplink signal processing.

Figure 5:
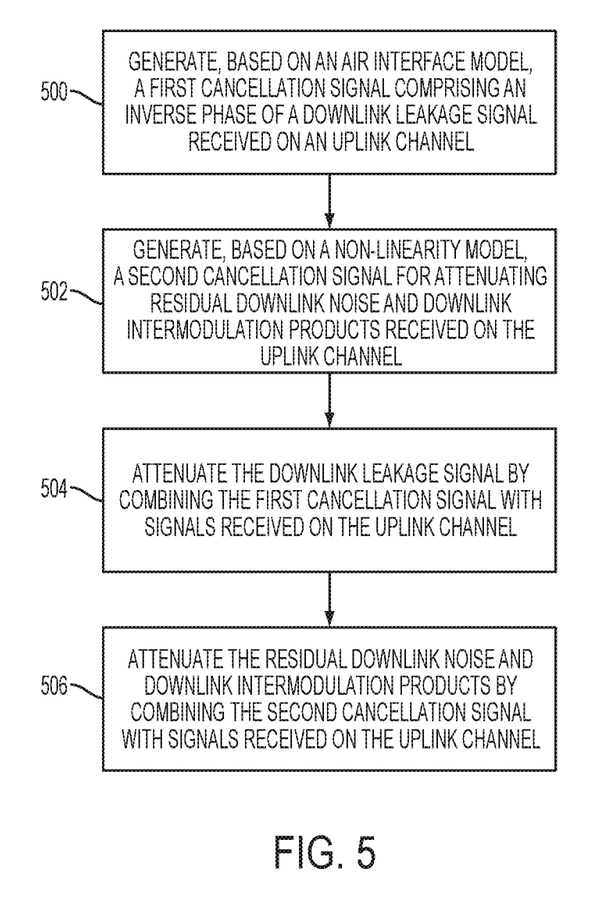
FIG. 5 is a flowchart depicting a process for using a multi-stage isolation sub-system in a remote antenna unit according to one aspect of the present disclosure.

FIG. 5 is a flow chart depicting an example of a process for using a multi-stage isolation sub-system in a remote antenna unit according to one aspect of the present disclosure. The process is described with respect to the system depicted in FIG. 1. Other implementations, however, are possible.

In block 500, a multi-stage isolation sub-system of a remote antenna unit generates, based on an air interface model, a first cancellation signal comprising an inverse phase of a downlink leakage signal received on an uplink channel. In some aspects, the cancellation signal can include an inverse phase of the downlink leakage signal. In additional or alternative aspects, the cancellation signal can include one or more other inverse signal characteristics of the downlink leakage signal. For example, in an air interface channel, a phase of a signal may be related to a frequency of the signal and an attenuation of a signal may be related to the frequency of the signal. One or more of these signal characteristics may be inverted to obtain an inverted channel. Unwanted broadband transmit signal components in a receive path may pass the inverted channel and thereby result in an inverted signal used for cancellation. In a non-limiting example, the multi-stage isolation sub-system can include an air interface modeling module 212 or 308 for generating an air interface model from a sampled reference signal. The multi-stage isolation sub-system can also include a digital processing module 202 with an adaptive filter 214 for generating the first cancellation signal based on the air interface model and an integrated radio device 204 for interfacing the digital processing module 202 to the RF antennas. In another example, the multi-stage isolation sub-system can include a dual channel processor with a first non-linear equalizer 310 that can generate the first cancellation signal. In a further example, the multi-stage isolation sub-system can include a gain/phase control module 408 for generating the first cancellation signal.

The first cancellation signal can be generated using the techniques described above with respect to FIGS. 2-4. For example, the downlink leakage signal can be provided to the multi-stage isolation sub-system via a reference signal. The multi-stage isolation sub-system can use the reference signal to model the air interface between the uplink antenna and the downlink antenna and generate parameters indicating the amount of phase shift to apply to the uplink signal to cancel the downlink leakage signal.

In block 502, a multi-stage isolation sub-system can generate, based on a non-linearity model, a second cancellation signal for attenuating residual downlink noise and downlink intermodulation products received on the uplink channel. In a non-limiting example, the multi-stage isolation sub-system can include one of the non-linear modeling modules 210, 306, or 404 that can model the non-linearities and residual noise present in the air interface between the uplink and downlink antennas. The multi-stage isolation sub-system can also include one of the non-linear equalizers 208, 316, or 406 that can generate the second cancellation signal based on the non-linearity model. The second cancellation signal can be generated using the techniques described with respect to FIGS. 2-4. For example, the non-linearity modeling module can use the non-linearity model to generate parameters indicating the amount of phase shift to apply in order to generate the second cancellation signal.

In block 504, a multi-stage isolation sub-system can attenuate the downlink leakage signal by combining the first cancellation signal with signals received on the uplink channel. For example, the multi-stage isolation sub-system can combine the signals received on the uplink channel with the first cancellation signal with a standard RF coupler device, such as a directional coupler. A directional coupler can combine the power of two RF signals that contain the same frequency. As the first cancellation signal has a phase inverse to that of the downlink leakage signal, combining the first cancellation signal with signals on the uplink channel can result in attenuating or cancelling the downlink leakage signal present on the uplink path.

In block 506, a multi-stage isolation sub-system can attenuate the residual noise and downlink intermodulation products by combining the second cancellation signal with signals received on the uplink channel. For example, the second cancellation signal can be combined with the signals on the uplink channel using a standard RF coupler device. The phase of the second cancellation signal can be inverse to the phase of the signals representing the residual noise and downlink intermodulation. Combining the second cancellation signal with the signals present on the uplink channel can result in attenuating or canceling any residual noise or intermodulation products on the uplink channel.

While the present subject matter has been described in detail with respect to specific aspects and features thereof, it will be appreciated that those skilled in the art, upon attaining an understanding of the foregoing may readily produce alterations to, variations of, and equivalents to such aspects and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A multi-stage isolation sub-system, comprising:
a first stage device including an air interface modeling module, the first stage device configured to generate a first cancellation signal for attenuating a downlink leakage signal received on an uplink channel, the first cancellation signal comprising an inverse signal characteristic as compared to the downlink leakage signal; and
a second stage device including a non-linearity modeling module, the second stage device communicatively coupled to the first stage device and configured to generate a second cancellation signal for attenuating residual downlink noise and downlink intermodulation products received on the uplink channel.

2. The multi-stage isolation sub-system of claim 1, further comprising a coupler configured to combine the first cancellation signal and the second cancellation signal with signals received on the uplink channel.

3. The multi-stage isolation sub-system of claim 2, wherein the first stage device comprises an adaptive filter communicatively coupled to the air interface modeling module and the second stage device comprises a non-linear equalizer communicatively coupled to the non-linearity modeling module.

4. The multi-stage isolation sub-system of claim 3, wherein the air interface modeling module is configured to generate a first set of parameters using a reference signal and to provide the first set of parameters to the adaptive filter, wherein the adaptive filter is configured to generate the first cancellation signal based on the first set of parameters,
wherein the non-linearity modeling module is configured to generate a second set of parameters using the reference signal and to provide the second set of parameters to the non-linear equalizer, wherein the non-linear equalizer is configured to generate the second cancellation signal based on the second set of parameters.

5. The multi-stage isolation sub-system of claim 2, wherein the first stage device comprises a first non-linear equalizer communicatively coupled to the air interface modeling module and the second stage device comprises a second non-linear equalizer communicatively coupled to the non-linearity modeling module.

6. The multi-stage isolation sub-system of claim 5, wherein the air interface modeling module is configured to generate a first set of parameters using a reference signal and to provide the first set of parameters to the first non-linear equalizer, wherein the first non-linear equalizer is configured to generate the first cancellation signal based on the first set of parameters,
wherein the non-linearity modeling module is configured to generate a second set of parameters using the reference signal and to provide the second set of parameters to the second non-linear equalizer, wherein the second non-linear equalizer is configured to generate the second cancellation signal based on the second set of parameters.

7. The multi-stage isolation sub-system of claim 6, wherein the first set of parameters and the second set of parameters comprise information indicating an amount of phase shift to apply to the downlink leakage signal.

8. A method, comprising:
generating, based on an air interface model, a first cancellation signal comprising an inverse signal characteristic as compared to a downlink leakage signal received on an uplink channel by a radio circuit;

generating, based on a non-linearity model, a second cancellation signal for attenuating residual downlink noise and downlink intermodulation products received on the uplink channel;

attenuating the downlink leakage signal by combining the first cancellation signal with signals received on the uplink channel; and attenuating the residual downlink noise and downlink intermodulation products by combining the second cancellation signal with the signals received on the uplink channel.

9. The method of claim 8, wherein the first cancellation signal is generated by an adaptive filter and the second cancellation signal is generated by a non-linear equalizer.

10. The method of claim 8, wherein the first cancellation signal is generated by a first non-linear equalizer and the second cancellation signal is generated by a second non-linear equalizer.

11. The method of claim 8, further comprising:

generating a first set of parameters using a reference signal and the air interface model;

providing the first set of parameters to a first non-linear equalizer, wherein the first non-linear equalizer generates the first cancellation signal based on the first set of parameters;

generating a second set of parameters using the reference signal and the non-linearity model; and providing the second set of parameters to a second non-linear equalizer, wherein the second non-linear equalizer generates the second cancellation signal based on the second set of parameters.

12. The method of claim 11, wherein the first set of parameters and the second set of parameters include information indicating a phase shift to apply to the downlink leakage signal.

13. The method of claim 8, further comprising:

generating a first set of parameters using a reference signal and the air interface model;

providing the first set of parameters to an adaptive filter, wherein the adaptive filter generates the first cancellation signal based on the first set of parameters;

generating a second set of parameters using the reference signal and the non-linearity model; and providing the second set of parameters to the a non-linear equalizer, wherein the non-linear equalizer generates the second cancellation signal based on the second set of parameters.

14. A remote antenna unit, comprising:

a multi-stage isolation sub-system communicatively coupled to an uplink antenna and a downlink antenna, the multi-stage isolation sub-system comprising:

a first stage device configured to generate a first cancellation signal to attenuate a downlink leakage signal received at the uplink antenna, the downlink leakage signal comprising an inverse signal characteristic as compared to the downlink leakage signal received at the uplink antenna; and a second stage device, communicatively coupled to the first stage device, the second stage device including a non-linearity modeling module and configured to generate a second cancellation signal to attenuate residual downlink noise and downlink intermodulation products received at the uplink antenna.

15. The remote antenna unit of claim 14, wherein the multi-stage isolation sub-system further comprises a coupler, communicatively coupled to the first stage device and the second stage device, the coupler configured to combine the first cancellation signal and the second cancellation signal with signals received on the uplink antenna.

16. The remote antenna unit of claim 15, wherein the first stage device comprises an adaptive filter configured to generate the first cancellation signal and the second stage device comprises a non-linear equalizer configured to generate the second cancellation signal.

17. The remote antenna unit of claim 15, wherein the first stage device comprises a first non-linear equalizer configured to generate the first cancellation signal and the second stage device comprises a second non-linear equalizer configured to generate the second cancellation signal.

18. The remote antenna unit of claim 17, further comprising:

an air interface modeling module communicatively coupled to the first non-linear equalizer, wherein the air interface modeling module is configured to generate a first set of parameters using a reference signal and provide the first set of parameters to the first non-linear equalizer, wherein the first non-linear equalizer is configured to generate the first cancellation signal based on the first set of parameters, wherein the non-linearity modeling module is configured to generate a second set of parameters using the reference signal and provide the second set of parameters to the second non-linear equalizer, wherein the second non-linear equalizer is configured to generate the second cancellation signal based on the second set of parameters.

19. The remote antenna unit of claim 18 wherein the first set of parameters and the second set of parameters comprise information indicating an amount of phase shift to apply to the downlink leakage signal.

20. The remote antenna unit of claim 14, wherein the first stage device comprises a gain and phase controller configured to generate the first cancellation signal and the second stage device comprises a non-linear equalizer configured to generate the second cancellation signal.

* * * * *

UNITED STATES PATENT AND TRADEMARK OFFICE
CERTIFICATE OF CORRECTION

PATENT NO. : 9,768,855 B2  
APPLICATION NO. : 15/114624  
DATED : September 19, 2017  
INVENTOR(S) : Lange

Page 1 of 1

It is certified that error appears in the above-identified patent and that said Letters Patent is hereby corrected as shown below:

In the Claims

At Column 14, Claim 14, Lines 1 and 2, please replace "downlink leakage" with --first cancellation--

Signed and Sealed this  
Twelfth Day of June, 2018

Andrei Iancu  
*Director of the United States Patent and Trademark Office*